United States Patent
Belfiore, Jr. et al.

(10) Patent No.: US 10,963,572 B2
(45) Date of Patent: *Mar. 30, 2021

(54) SYSTEMS AND METHODS FOR CYBERSECURITY RISK ASSESSMENT

(71) Applicant: Aon Global Operations Ltd (Singapore Branch), Singapore (SG)

(72) Inventors: Anthony R. Belfiore, Jr., Mahwah, NJ (US); Mani Dhesi, London (GB); Adam Peckman, London (GB); Joseph Martinez, Boonton, NJ (US)

(73) Assignee: Aon Global Operations SE Singapore Branch, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,075

(22) Filed: Aug. 13, 2019

(65) Prior Publication Data
US 2020/0042716 A1    Feb. 6, 2020

Related U.S. Application Data

(63) Continuation of application No. 15/820,786, filed on Nov. 22, 2017, now Pat. No. 10,387,657.
(Continued)

(51) Int. Cl.
*G06F 21/57* (2013.01)
*H04L 29/06* (2006.01)
*G06Q 10/06* (2012.01)

(52) U.S. Cl.
CPC ....... *G06F 21/577* (2013.01); *G06Q 10/0635* (2013.01); *H04L 63/1433* (2013.01);
(Continued)

(58) Field of Classification Search
CPC .............. H04L 63/1433; G06F 21/577; G06F 2221/034; G06F 2221/2101; G06Q 10/0635
See application file for complete search history.

(56) References Cited

U.S. PATENT DOCUMENTS

| 7,584,508 B1 | 9/2009 | Kashchenko et al. |
| 9,294,498 B1 | 3/2016 | Yampolskiy et al. |

(Continued)

FOREIGN PATENT DOCUMENTS

| CA | 2357268 A1 | 7/2002 |
| EP | 2498198 | 5/2017 |

(Continued)

OTHER PUBLICATIONS

Chmielecki T, et al. Enterprise-oriented cybersecurity management. In 2014 Federated Conference on Computer Science and Information Systems. Sep. 7, 2014. (pp. 863-870). IEEE. (Year: 2014).*
(Continued)

*Primary Examiner* — Robert B Leung
(74) *Attorney, Agent, or Firm* — Gardella Grace P.A.

(57) ABSTRACT

In an illustrative embodiment, methods and systems for cybersecurity assessment of an organization's technology infrastructure include identifying features of the technology infrastructure and automatically generating a threat profile relevant to both the technology infrastructure and the organization's business (and/or business objectives), where the threat profile includes potential threat actors and threat scenarios applicable to the technology infrastructure. The methods and systems may include evaluating cybersecurity controls of the organization's technology infrastructure in light of the threat profile to identify and rate vulnerabilities within the technology infrastructure.

20 Claims, 11 Drawing Sheets

Related U.S. Application Data

(60) Provisional application No. 62/425,556, filed on Nov. 22, 2016.

(52) U.S. Cl.
CPC ........ *H04L 63/20* (2013.01); *G06F 2221/034* (2013.01); *G06F 2221/2101* (2013.01)

(56) References Cited

U.S. PATENT DOCUMENTS

| | | | |
|---|---|---|---|
| 10,387,657 | B2 | 8/2019 | Belfiore, Jr. et al. |
| 10,402,788 | B2 | 9/2019 | Morrow et al. |
| 2002/0049617 | A1 | 4/2002 | Lencki et al. |
| 2002/0095316 | A1 | 7/2002 | Toan et al. |
| 2002/0103680 | A1 | 8/2002 | Newman |
| 2002/0169727 | A1 | 11/2002 | Melnick et al. |
| 2004/0138950 | A1 | 7/2004 | Hyman et al. |
| 2005/0065807 | A1 | 3/2005 | DeAngelis et al. |
| 2007/0067846 | A1 | 3/2007 | McFarlane et al. |
| 2009/0106656 | A1 | 4/2009 | Handy et al. |
| 2010/0114634 | A1* | 5/2010 | Christiansen ........ G06Q 30/018 705/7.28 |
| 2011/0138471 | A1 | 6/2011 | Van de Weyer et al. |
| 2011/0201902 | A1 | 8/2011 | Shiga et al. |
| 2012/0296455 | A1 | 11/2012 | Ohnemus et al. |
| 2013/0227697 | A1 | 8/2013 | Zandani |
| 2014/0137257 | A1 | 5/2014 | Martinez et al. |
| 2014/0142990 | A1 | 5/2014 | Manjarekar |
| 2014/0173739 | A1 | 6/2014 | Ahuja et al. |
| 2014/0195269 | A1 | 7/2014 | Sircar et al. |
| 2015/0339446 | A1 | 11/2015 | Sperling et al. |
| 2015/0356477 | A1 | 12/2015 | Milkman et al. |
| 2016/0110819 | A1 | 4/2016 | Abramowitz |
| 2016/0164892 | A1 | 6/2016 | Satish et al. |
| 2016/0234247 | A1 | 8/2016 | Ng et al. |
| 2016/0248800 | A1 | 8/2016 | Ng et al. |
| 2016/0378932 | A1 | 12/2016 | Sperling et al. |
| 2017/0046519 | A1 | 2/2017 | Cam |
| 2017/0154337 | A1 | 6/2017 | Wingate-Whyte et al. |
| 2017/0331849 | A1 | 11/2017 | Yu |
| 2018/0124091 | A1 | 5/2018 | Sweeney et al. |
| 2018/0146004 | A1 | 5/2018 | Belfiore, Jr. et al. |
| 2018/0270265 | A1* | 9/2018 | Sage ...................... H04L 63/102 |
| 2019/0164134 | A1 | 5/2019 | Morrow et al. |

FOREIGN PATENT DOCUMENTS

| | | |
|---|---|---|
| EP | 3545418 A1 | 10/2019 |
| WO | 0133410 A2 | 5/2001 |
| WO | 2018098294 A1 | 5/2018 |

OTHER PUBLICATIONS

International Search Report and Written Opinion dated Feb. 12, 2018 issued in related International Application No. PCT/US17/63035, 15 pages (submitted in related U.S. Appl. No. 15/820,786).

Notice of Allowance dated Apr. 4, 2019 in related U.S. Appl. No. 15/820,786.

International Search Report and Written Opinion issued in International Application No. PCT/SG2018/050580 dated Feb. 12, 2019.

Rawat et al., "Advancement of recommender system based on clickstream data using gradient boosting and random forest classifiers." 2017 8th International Conference on Computing, Communication and Networking Technologies (ICCCNT). IEEE, 2017.

International Preliminary Report on Patentability issued in International Application No. PCT/US2017/063035 dated May 28, 2019.

Non-Final Office Action issued in U.S. Appl. No. 15/820,786 dated Feb. 28, 2018.

Final Office Action issued in U.S. Appl. No. 15/820,786 dated Nov. 2, 2018.

TailorWell Launches First Online Health Insurance Comparison Tool Targeted Specifically for Unique Needs of Small Businesses in Washington and Oregon, Marketwire, COMTEX News Network, Inc., Nov. 18, 2015.

Supplementary European Search Report issued in EP Application No. 17874349.8 dated Jul. 9, 2020.

* cited by examiner

SYSTEMS AND METHODS FOR CYBERSECURITY RISK ASSESSMENT

RELATED APPLICATIONS

This application is a continuation of and claims the benefit of priority from U.S. patent application Ser. No. 15/820,786, entitled "Systems and Methods for Cybersecurity Risk Assessment," and filed Nov. 22, 2017, which claims priority to U.S. Provisional Patent Application Ser. No. 62/425,556, entitled "Systems and Methods for Cybersecurity Risk Assessment," and filed Nov. 22, 2016. All above identified applications are hereby incorporated by reference in their entireties.

BACKGROUND

Various standards relating to risk management exist to provide principles and generic guidelines on risk management. Existing cybersecurity standards include ETSI Cybersecurity Technical Committee, ISO 27001 and 27002, *Standard of Good Practice*, NERC, NIST, ISO 15408, RFC 2196, ISA/IEC-62443, IEC 62443 Conformity Assessment Program, IASME, and the like.

The ETSI Cybersecurity Technical Committee is responsible for the standardization of Cybersecurity internationally and for providing a center of relevant expertise for other ETSI committees. However, the different methods of governing secure transactions in the various Member States of the European Union can make it difficult to assess the respective risks and to ensure adequate security.

The ISO 27001 and 27002 is part of the growing ISO/IEC 27000 family of standards. The ISO 27001 formally specifies a management system that is intended to bring information security under explicit management control. ISO 27002 provides beset practice recommendations on information security management. However, without ISO 27001, ISO 27002 control objectives are ineffective.

The *Standard of Good Practice* is a comprehensive list of best practices for information security. However, the list is only updated every two years at the most.

NERC is the North American Electric Reliability Corporation which addresses patching in NERC CIP 007-6 Requirement 2. However, NERC requires Bulk Power System Operator/Owners to identify the source or sources utilized to provide security related patches for cyber assets.

NIST is the National Institute of Standards and Technology which provides a high-level taxonomy of cybersecurity outcomes and a methodology to assess and manage those outcomes. However, NIST may be limited in that NIST is intended to help private sector organizations that provide critical infrastructure with guidance on how to protect it.

ISO 15408 is a standard that develops Common Criteria, which allows different software applications to be integrated and tested in a secure way. However, ISO 15408 does not directly provide a list of product security requirements or features for specific products.

RFC (Request for Comments) 2196 is a memorandum for developing security policies and procedures for information systems connected to the internet. The RFC 2196 provides a general and broad overview of information security including network security, incident response, and security policies. However, RFC 2196 may be limited to information systems connected to the internet.

ISA/IEC-62443 is a series of standards, technical reports, and related information that define procedures for implementing electronically secure Industrial Automation and Control Systems (IACS). This guidance applies to end-users (i.e. asset owner), system integrators, security practitioners, and control systems manufacturers responsible for manufacturing, designing, implementing, or managing industrial automation and control systems. However, the ISA/IEC-62443 may be limited to Industrial Automation and Control Systems.

The IEC 62443 Conformity Assessment Program certifies Commercial Off-the-shelf IACS products and systems addressing securing the IACS supply chain. However, the IEC 62443 can be limited to certifying products from predetermined industries (e.g., automotive, oil and gas, etc.).

The IASME is a UK-based standard for information assurance at small-to-medium enterprises. The IASME provides criteria and certification for small-to-medium business cybersecurity readiness. However, the IASME may be limited as it may not apply to large businesses.

Existing survey tools lack a holistic understanding of the cyber exposures of a business, especially across different business units and various business aspects within larger organizations. Additionally, the existing survey tools fail to link risks to specific threats and identify areas of weakness while providing actionable improvement recommendations. As a result, existing survey tools fail to enhance risk financing and insurance coverage linked to priority cyber risk exposure, as well as preventing clients from understanding the insurability of their technology assets with respect to cybersecurity risks.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY OF ILLUSTRATIVE EMBODIMENTS

According to aspects of the disclosed subject matter, systems and methods for cybersecurity risk assessment analyze an organization's technology infrastructure and software system utilization to identify vulnerabilities in the organization's computing environment to an assortment of cybersecurity threats. The cybersecurity risk assessment may collect (e.g., via a survey user interface, through crawling the network infrastructure, etc.), information from an organization regarding both the organization's technology infrastructure (e.g., computing systems, hardware, and other data-relaying equipment such as printers, faxes, and smart phones as well as data stores such as employee records, business records, transactional records, and the like) and information technology infrastructure (e.g., software packages, tools, fire wall setups, gateway security, third party software vendor interfaces, and other digital information controls). The cybersecurity risk assessment may involve obtaining an organization's business objectives (e.g., through survey questions) and applying the business objectives to features of the technology infrastructure to identify critical features of the organization's technology infrastructure. The cybersecurity risk assessment may include identifying a threat profile applicable to the organization's business and technology infrastructure. The threat profile may include identified threat actors, threat scenarios (e.g., type of vulnerability attacked), and threat vectors (e.g., possible actions performed by the threat actor). The threat profile may be applied to the organization's technology infrastructure to evaluate cybersecurity controls across a number of security domains. A vulnerability assessment, provided responsive to the cybersecurity control analysis, may be used to prepare a risk profile report usable by the organization in identifying and applying solutions to shore up weaknesses in the organization's cybersecurity infrastructure.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1:
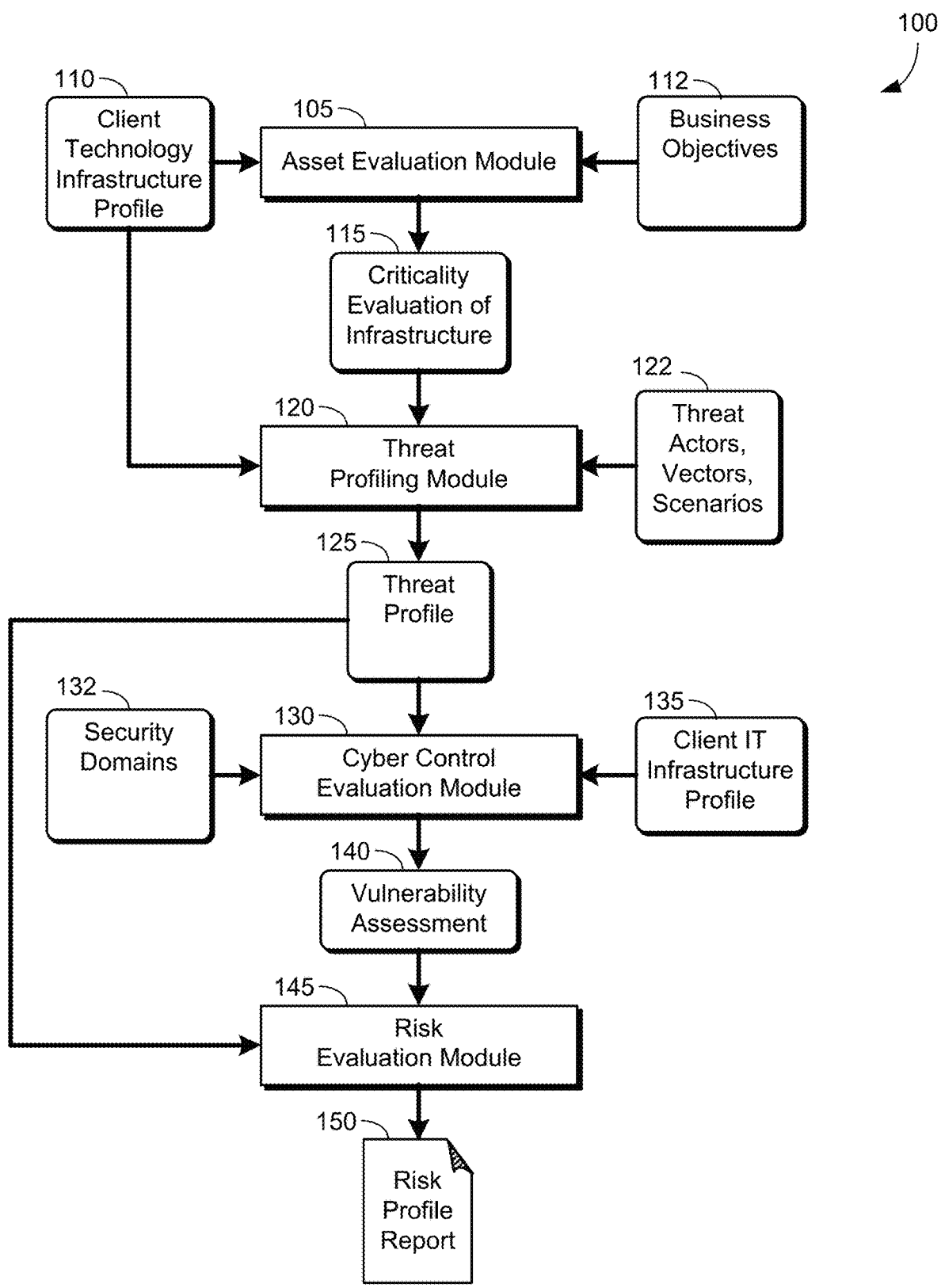
FIG. 1 depicts an exemplary risk assessment operational workflow according to one or more aspects of the disclosed subject matter.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

FIG. 1 depicts an exemplary risk assessment workflow 100 according to one or more aspects of the disclosed subject matter. The risk assessment workflow 100 is used to aid in cyber risk analysis of an organization's technology infrastructure and software system utilization. The risk assessment workflow 100, for example, may be integrated with a survey user interface requesting information from an organization regarding both the organization's technology infrastructure (e.g., computing systems, hardware, and other data-relaying equipment such as printers, faxes, and smart phones as well as data stores such as employee records, business records, transactional records, and the like) and information technology infrastructure (e.g., software packages, tools, fire wall setups, gateway security, third party software vendor interfaces, and other digital information controls). In another example, the risk assessment workflow 100 may be integrated with a network analysis module that automatically identifies resources connected to the organization's network (e.g., Intranet or other organizationally-bounded networking environment).

The risk assessment workflow, in some implementations, includes an asset evaluation module 105 for receiving and evaluating a client technology infrastructure profile 110. For example, the asset evaluation module 105 may present survey questions to a user or accept survey information collected from multiple users (e.g., multiple IT leads within a large organization) to analyze the existing infrastructure of the organization. This survey information can be compiled into the client technology infrastructure profile. Instead of or in addition to survey questions, at least a portion of the client technology infrastructure profile may be derived through automated network topography collection, where a software component analyzes resources connected to an organization's network.

The client technology infrastructure profile 110 can correspond to any critical technology and business objectives of the client. The critical technology can include hardware, software, data, and the like. The technology assets can correspond to various business areas including production/operation, intellectual property, human resource, marketing/communication, financial/legal, customer/partner, and the like. The production/operation can include business critical data and systems required to deliver commercial services. Intellectual property can include sensitive and/or critical intellectual property existing within the company or third parties. Human resource can include employee data that is processed and stored within the company and/or by third parties. Marketing/communications can include marketing and client communications such as e-mails, external facing websites, social media, and the like. Financial/legal can include sensitive financial and legal data that is digitally processed within the company and/or by third parties. Customer/partner can include sensitive and/or confidential information on customers and partners.

Additionally, the asset evaluation module 105 receives information regarding business objectives 112 related to the organization corresponding to criticality of various segments of the client technology infrastructure 110. The criticality, in some examples, can correspond to one or more of confidentiality, integrity, availability, and financial value. For example, confidentiality can correspond to a business requirement of privacy of information. Integrity can correspond to a business requirement of accuracy of information. Availability can correspond to a business requirement of timeliness and reliability of access to systems/information. Financial value can correspond to a business requirement of maintaining and/or increasing monetary value. The business objectives, in one example, may be obtained through presenting survey questions to an organization's representative (e.g., CEO, CTO, etc.) regarding the identified client technology infrastructure. In one example, at least a portion of the business objectives may be inferred. For example, an online retailer may be presumed to rank availability to transactional resources as a high priority, while a hospital may rank confidentiality and privacy of information as having top importance.

Based on the client technology infrastructure profile 110 and the business objectives 112, the asset evaluation module 105 can calculate an asset criticality score. The asset criticality score can be based on an importance of an asset to one or more business objectives 112. As a result, the asset evaluation module 105 can provide a criticality evaluation of infrastructure 115, listing and/or ranking segments of the client technology infrastructure 110 according to relative importance identified in the business objectives 112.

In evaluating the client technology infrastructure profile 110, the risk assessment workflow 100, in some implementations, includes a threat profiling module 120 for identifying specific potential threats (risks) 122 to a defined technology asset (e.g., segment of the client technology infrastructure profile 110). The threat profiling module 120 determines the threat profile 125 as a function of asset criticality (e.g., determined by the asset evaluation module 105) and particular threats 122 mapped to aspects of the client technology infrastructure profile 110. First, the threat profiling module 120 identifies threat actors 122a relevant to individual segments of the client technology infrastructure profile 110. The threat actors 122a, in some examples, can be cyber criminals, state-sponsored actors, hacktivists, insiders, partners, disasters, and the like. Further, the threat profiling module 120 evaluates potential actions of each threat actor 122a against a particular segment of the technology infrastructure. For example, each threat actor 122a may activate one or more threat vectors 122b (e.g., actions) resulting in a particular threat scenario 122c (e.g., exposure of sensitive information, loss of data, etc.). Threat vectors 122b, in some examples, can include malware, hacking, social engineering, misuse, error, physical, environmental, and the like. The threat scenario 122c can correspond to losing control of the critical technology asset (the critical assets being identified via the asset evaluation module 105, for example) in response to any one or more threat vectors 122b deployed by the threat actor 122a. For each threat actor 122a relevant to each segment of the client technology infrastructure 110, in other words, a threat can be determined including an intent, objectives, and capabilities of the threat actor's actions 122b upon the identified segment of the client technology infrastructure. Intent can be accidental (e.g., a flood or other natural disaster, employee mistake, etc.) or malicious.

Threats identified by the threat profiling module 120 can be mapped against the criticality of the technology asset based on the criticality evaluation 115 to define a threat score component of the threat profile 125. For example, a criticality of a technology asset could be confidentiality and a threat objective of a threat actor could be information disclosure/unauthorized access in which there is a loss of confidentiality via unauthorized disclosure of information. Threat scores represent relative impact of a particular threat based upon the criticality of the underlying segment of the technology infrastructure.

The threat profile 125, in some implementations, is provided by the threat profiling module 120 to a cyber control evaluation module 130 to evaluate the organization's current protections against each threat identified within the threat profile 125. The cyber control evaluation module 130 can determine a target level of protection for each segment of the client technology infrastructure 110 and each threat. The cyber control evaluation module 130 further compares a current level of protection for each segment of the client technology infrastructure 110 and each threat based upon a client IT infrastructure profile 135. Comparison of the target level of protection to the current level of protection results in an output of vulnerability assessment 140.

The cyber control evaluation module 130 receives and evaluates the client IT infrastructure profile 135 to identify a current level of protection (also referred to as the current control performance). The client IT infrastructure profile 135 may be obtained, for example, through a series of survey questions presented to information technology representative(s) of the organization to identify IT security mechanisms presently in place, such as, in some examples, access protections, encryption mechanisms, firewalls, and other cyber protection tools applied to protect the technology infrastructure 110. Further, the client IT infrastructure profile may include additional security mechanisms such as employee training on best practices for protecting data resources within the organization.

The cyber control evaluation module 130, in some implementations, analyzes the client IT infrastructure profile 135 to identify IT controls applied to a set of predetermined security domains 132. Additionally, the cyber control evaluation module 130 can determine a target control performance which can be based on the threat profile 125. The vulnerability assessment 140 can be determined as a function of comparing the target control performance against the current control performance for each relevant security domain 132. More specifically, the vulnerability assessment 140 can be calculated across each of the predetermined security domains as the predetermined security domains relate to a specific threat to a technology asset identified in the threat profile 125. Additionally, a threat-specific control environment can be defined based on the target control performance and the current control performance relating to controls specific to the threat scenarios identified in the threat profile 125 (including threat vectors). As a result of the threat specific control environment, the vulnerability assessment 140 can be determined more precisely.

In some implementations, the cyber control evaluation module 130 determines target control performance based in part upon the threat scores related to each threat identified within the threat profile 125. For example, fewer resources may be allocated to protection of low priority assets of the client technology infrastructure 110 as opposed to the high priority assets of the client technology infrastructure 110. In this manner, in addition to vulnerability assessment 140, the cyber control evaluation module 130 may identify one or more areas of cybersecurity overprotection. The organization, for example, may use areas of cybersecurity overprotection for reallocating budget assets from low priority protection to high priority protection.

The risk assessment workflow 100, in some implementations, includes a risk evaluation module 145. The risk evaluation module 145 can provide a risk profile report 150 identifying risks and associated vulnerabilities based upon the vulnerability assessment 140. The risk evaluation module 145 can include calculating a cyber risk score as a function of the threat profile (determined via the threat profiling module 120) and the vulnerability assessment 140. The cyber risk score, for example, may be assessed on a per threat and/or per security domain basis. The risk profile report 150 can provide a comprehensive review of all assessed cyber risks. The risk profile report 150 can include visualizations (e.g., graphs, charts, etc.) comparing the target evaluation to the current control evaluation, as well as visualizations regarding likely threats to various assets of the client technology infrastructure 110.

Figure 2:
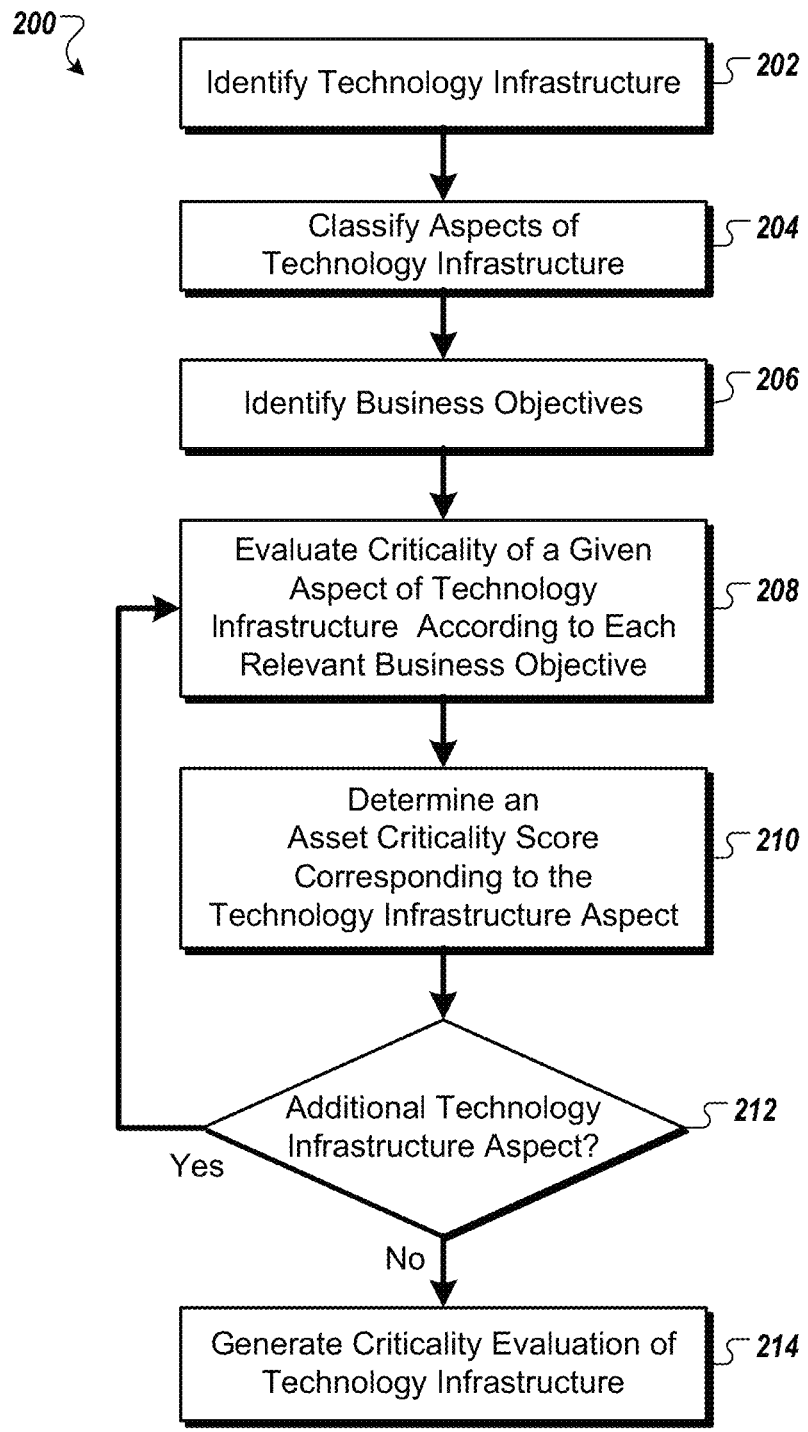
FIG. 2 depicts an algorithmic flow chart of an exemplary method for asset evaluation according to one or more aspects of the disclosed subject matter.

FIG. 2 depicts a flow chart of an example method 200 for asset evaluation according to one or more aspects of the disclosed subject matter. The asset evaluation, for example, may be performed by the asset evaluation module 105 of FIG. 1.

In some implementations, the method 200 begins with identifying technology infrastructure (202). The technology infrastructure, as a general overview, relates to hardware assets for processing and storing organizational data, software assets designed to process, store, and/or transmit organizational data, as well as the organizational data itself (e.g., in both printed and electronic form). The infrastructure may be spread across a number of physical locations (e.g., business units). A portion of the infrastructure may be maintained outside the walls of the organization. In some examples, cloud based services and/or storage utilized by the organization, off-site archival services provided by third parties, and Internet-based processing of information provided by third parties may all be considered as technology infrastructure eligible for protection by the organization.

The technology infrastructure, for example, may be identified based upon conducting a survey related to aspects of the business. The survey may be an interactive online survey designed to provide "drill-down" questions regarding various features of the technology infrastructure. Multiple individuals or departments of the organization may contribute features of the technology infrastructure. For example, information may be gleaned in parallel and/or in series from multiple representatives of an organization when developing a full picture of the technology infrastructure (e.g., a technology infrastructure profile such as the client technology infrastructure profile 110 described in relation to FIG. 1).

Each technology asset of the technology infrastructure may be categorized and/or described. For example, turning to FIG. 4A, as part of a cybersecurity risk assessment information tree 400, technology assets 402 may be placed in a particular technology asset category 404 (e.g., digital data, software, hardware, prototype equipment, printed data, etc.). Additionally, the technology asset may be identified by a brief description 406 (e.g., financial data, gateway server, etc.).

Figure 4A:
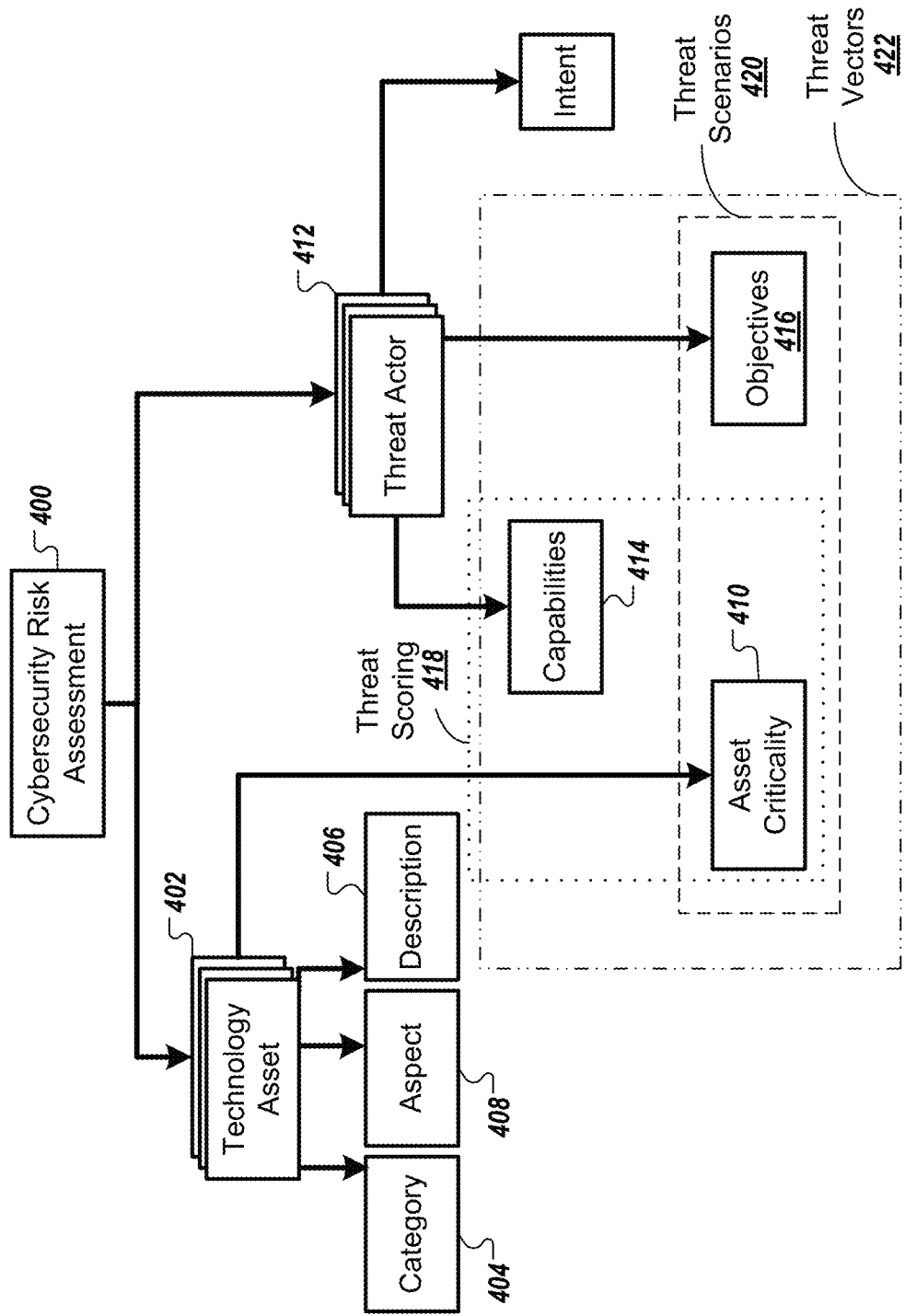
FIG. 4A depicts an exemplary overview of a cybersecurity risk assessment according to one or more aspects of the disclosed subject matter.

Returning to FIG. 2, assets of the technology infrastructure, in some implementations, are classified (204). As shown in FIG. 4A, for example, each technology asset may be assigned a particular aspect (e.g., business unit). One aspect of the technology infrastructure, for example, may be production/operational data and systems, used to deliver commercial services or produce commercial goods. Production/operational data and systems, in a particular example, can include industrial control systems. Another aspect of the technology infrastructure, for example, may be intellectual property, such as engineering designs, software development code, formulas, marketing designs, and prototypes. In a third example, technology infrastructures often include a human resource aspect for collection and maintenance of employee-related data. Additionally, a marketing and client communication aspect may include externally-exposed websites or portals, social media resources maintained by the organization, marketing materials (e.g., presentation slides, sales sheets, etc.) as well as client communications such as e-mails and voice mail recordings. A financial/legal technology infrastructure aspect, in a further example, can include an organization's financial records, legal data, and other sensitive digital matter related to financial or legal topics. A final aspect of the technology infrastructure may include customer/partner information, such as trade secrets, financial data, legal data, and other sensitive information shared with the organization by third parties or customers.

In some implementations, business objectives are identified (206). The business objectives, in some examples, can include reputation/customer confidence, health and wellbeing, regulatory and legal compliance, financial sustainability, productivity and operational continuity, and the like. The business objectives can be assessed, for example, based upon survey questions targeting business concerns relevant to the particular organization. For example, a dynamic interactive survey GUI may supply questions relevant to an organization's industry, size, geography, technology infrastructure, and/or line of business.

The criticality of a given aspect of the technology infrastructure, in some embodiments, is evaluated according to the business objectives (208). Asset criticality can be evaluated, for example, through identifying relevance of a technology asset or aspect of the technology infrastructure to each of the business objectives. Criticality, in a particular example, can defined or assigned (e.g., as a numerical value on a scale of importance) based on a combination of any of the following: confidentiality (e.g., privacy of information), integrity (e.g., accuracy of information), availability (e.g., timeliness and reliability of access to systems and information) and financial (e.g., monetary) value. Based upon general business objectives, for example, the organization's representative may be presented detailed questions, triggered for example based upon responses related to more general inquiries (e.g. whether the organization develops software assets internally etc.). In illustration, if the criticality of a given technology asset relates to integrity of a system and/or data, the criticality of the integrity can be rated low when integrity has a negligible impact on business objectives, medium when integrity has a moderate impact on business objectives, and high when integrity has a direct and/or material impact on business objectives. Other gradations of criticality are possible, such as a 5-point scale, 10-point scale, etc.

In some implementations, an overall asset criticality score corresponding to the technology infrastructure aspect is determined (210). Because multiple business objectives can impact a particular technology infrastructure aspect or technology asset, the method may determine an overall (combined) score according to the criticality evaluation.

For illustration, an aspect of the technology infrastructure can be human resource information, particularly employee records (a data asset) stored on an internal server (a hardware asset). The asset criticality scores according to each business objective may be as follows: high for confidentiality, low for integrity, and low for availability. The score may be determined based upon equal weighting (e.g., resulting in a medium criticality score). To protect any highly critical data, in another example, the score may be determined as the highest scoring business aspect (e.g., high).

The method may repeat (212) evaluation of criticality of each technology infrastructure aspect (208) and determination of asset criticality scores (210) for all technology infrastructure aspects identified in step 202.

Upon completion, in some implementations, a criticality evaluation of the technology infrastructure is generated. The overall asset criticality score and/or the asset criticality evaluation (e.g., score per business aspect), for example, may be supplied in the criticality evaluation for review (e.g., by the organization) and/or as a contributor to additional analysis. In a particular example, the asset criticality evaluation may be provided to the threat profiling module 120 for use in developing the threat profile 125, as described in relation to FIG. 1. The criticality evaluation, in another example, may be represented by asset criticality information 410 of FIG. 4A.

Figure 3:
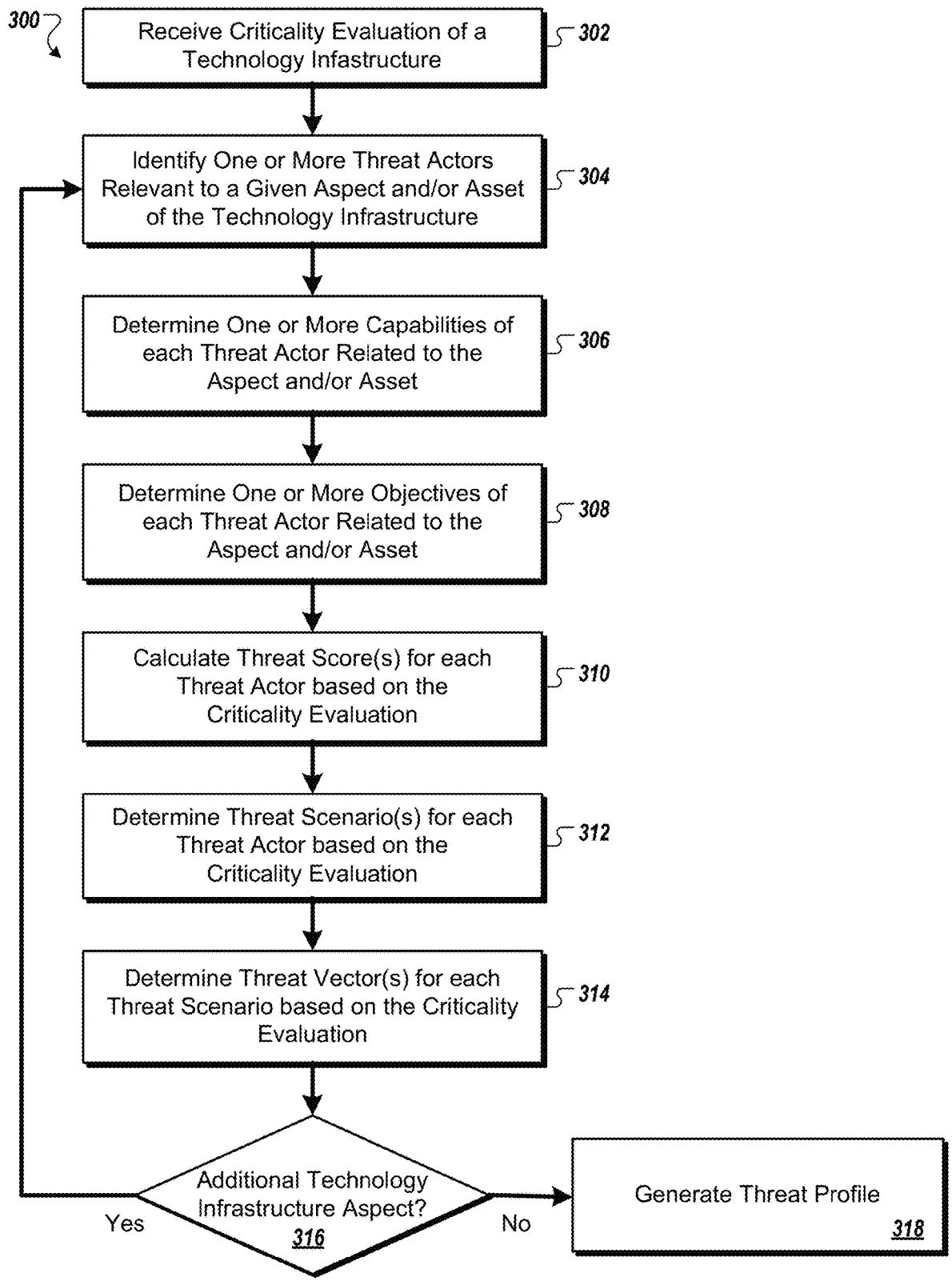
FIG. 3 depicts an algorithmic flow chart of an exemplary method for determining a threat profile according to one or more aspects of the disclosed subject matter.

FIG. 3 depicts a flow chart of an example method 300 for determining a threat profile according to one or more aspects of the disclosed subject matter. The method 300, for example, may be used by the threat profiling module 120 described in FIG. 1 for developing the threat profile 125.

In some implementations, a technology infrastructure criticality evaluation is received (302). The criticality evaluation may detail relative criticality of each aspect of an organization's technology infrastructure and/or each asset within the organization's technology infrastructure, as described in relation to steps 202 and 204 of FIG. 2. The technology infrastructure criticality evaluation, for example, may be provided to the method 300 as criticality evaluation of the technology infrastructure 115 from the asset evaluation module 105 of FIG. 1.

In some implementations, one or more threat actors relevant to each aspect and/or asset of the technology infrastructure are determined (304). The threat actors, in some examples, can be cyber criminals, state-sponsored actors, hacktivists, insiders, partners (suppliers/customers), disasters, and the like. The threat actors, for example, may be represented by a set of threat actor information 412 in the cybersecurity risk assessment tree 400 of FIG. 4A.

In some implementations, at least one capability of each threat actor is determined (306). The capabilities, for example, may be relevant to the particular technology aspect/asset. Capability may be assessed based upon a variety of factors depending upon the threat actor and/or the technology asset. One factor effecting threat actor capability is the technical strength of the threat actor (e.g., a high school aged hacker has lower technical strength than a professional cyber-criminal). Financial resources of the threat actor are another capability factor. For example, the professional cyber-criminal will be better funded and able to afford fancier equipment than the high school aged hacker. In another example, access of the threat actor to the resources may be a contributing factor to capability. For example, internal threat actors typically have a much higher level of access to technical resources than outside threat actors. Historic trends may also be factored into a threat actor's capabilities. For example, if a type of threat actor has attacked multiple peers of the organization, the threat actor may be viewed as being capable of attacking the organization as well (e.g., a "know how" or "modus operandi" factor). The capabilities, for example, are illustrated as capability information 414 of the cybersecurity risk assessment information tree 400 of FIG. 4A.

Additionally, in some implementations, one or more objectives are determined for each threat actor (308). The threat actor's capabilities, for example, may be mapped to one or more objectives, such as disrupting data availability, harming data integrity, or damaging data confidentiality (e.g., by disclosing sensitive data). The objectives, for example, are illustrated as objectives information 416 of the cybersecurity risk assessment information tree 400 of FIG. 4A.

In some implementations, one or more threat scores are calculated for each threat actor based on a criticality evaluation (310). The threat score (or threat rating), for example, may be a function of both a particular capability and the relative criticality (e.g., criticality score) of the corresponding asset. As illustrated in FIG. 4A, threat scoring 418 encompasses an evaluation of the capabilities information 414 in light of the asset criticality information 410. The threat score, in a particular example, may be ranked on a three-point scale (e.g., low, medium, or high). In another example, the threat score may be applied on a 5-point, 10-point or other type scale. In an illustrative example, the asset criticality score may be weighted by a threat actor score (e.g., relative capability of the threat actor on an n-point scale), or vice-versa, to determine a threat score. In some illustrative examples regarding technical strength of the threat actor, a low threat score can correspond to low technical capability, a medium threat score can correspond to moderate technical strength, and a high threat score can correspond to high technical capability. Similarly, with respect to financial support, a low threat score can correspond to minimally funded, a medium threat score can correspond to moderately funded, and a high threat score can correspond to well-funded. Additionally, with respect to access, a low threat score can correspond to no access to asset, a medium threat score can correspond to remote access to asset, and a high threat score can correspond to privileged access to asset. These factors of threat actor score may be combined into a comprehensive threat actor score. The threat scores, relating to both the threat actor score and the asset criticality score, represent anticipated relative impact of a particular threat actor in relation to the particular technology asset based upon the capability (e.g., threat actor score) of the particular threat actor.

In some implementations, threat scenarios are determined for each threat actor based on the criticality evaluation (312). Each threat scenario represents the loss of control of the technology asset in response to one or more threat vectors deployed by a particular threat actor. A threat scenario can be defined by mapping the threat objectives of a particular threat actor against the criticality of the technology asset. As illustrated in FIG. 4A, for example, threat scenarios 420 are derived from the asset criticality information 410 and the objectives information 416. In an illustrative example, based upon an objective of damage to data availability, a threat scenario may be a technology disruption or a denial of data access. Regarding data confidentiality, a threat scenario may be an unauthorized access event or information disclosure. In a final illustration regarding integrity, the threat scenario may be a system modification or destruction.

In some implementations, one or more threat vectors are determined for each threat scenario based on the criticality evaluation (314). Threat vectors are particular actions that a particular threat actor may be capable of launching against the given technological asset. These actions are based both on the capabilities of the threat actor and the objectives of the threat actor. As illustrated in FIG. 4A, for example, threat vectors 422 are derived from the asset criticality information 410, the capabilities information 414, and the objectives information 416. Vectors can include, in some examples, malware, hacking, social media disruption, misuse of confidential materials, user error resulting in loss of data, physical destruction of hardware assets, and environmental damage to hardware assets. In an illustrative example, based upon denial of data access scenario, a threat vector may be a denial of service (DoS) attack. Regarding unauthorized data access, a threat scenario may be theft of login information. In a final illustration regarding data integrity, the threat vector may be a software system modification or destruction through malware.

Steps 304-314 of the method 300, in some implementations, are repeated for each additional technology infrastructure aspect/asset (316). Upon completing this evaluation, a threat profile, in some implementations, is generated (318). The information in the threat profile represents the impact of a specific threat actor to a defined technology asset. The threat profile may include both the threat scenarios and the threat vectors for each technology asset of the technology infrastructure. The threat profile, for example, may be supplied for review (e.g., by the organization) and/or as a contributor to additional analysis. In a particular example, the threat profile may be provided to the cyber control evaluation module 130 for use in identifying vulnerability assessment 140, as described in relation to FIG. 1.

Figure 5:
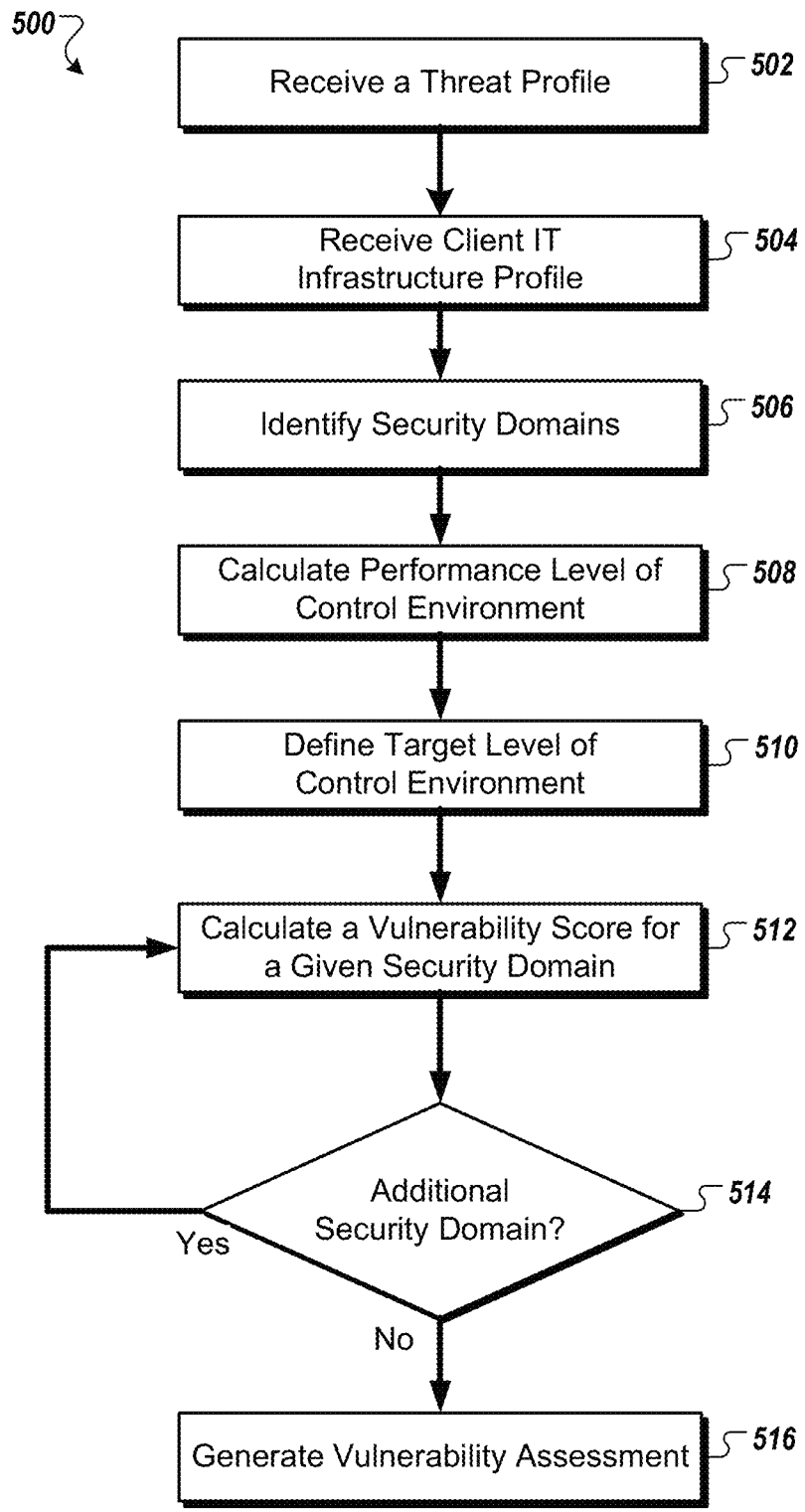
FIG. 5 depicts an algorithmic flow chart of an exemplary method for evaluating the cybersecurity vulnerabilities of an organization according to one or more aspects of the disclosed subject matter.

FIG. 5 depicts a flow chart of an example method 500 for determining a vulnerability assessment according to one or more aspects of the disclosed subject matter. The method 500, for example, may be used by the cyber control evaluation module 130 of FIG. 1 to determine the vulnerability assessment 140.

In some implementations, a threat profile is received (502). The threat profile may represent the impact of a specific threat actor to a defined technology asset and may be generated as described in relation to step 318 of FIG. 3. The threat profile, for example, may be provided to the method 500 as threat profile 125 generated by the threat profiling module 120 of FIG. 1. The threat profile may include the threat scenarios 420 and threat vectors 422 of FIGS. 4A and 4B. The threat scenarios and threat vectors, for example, may include information as described in relation to steps 312 and 214 of FIG. 3.

In some implementations, a client IT infrastructure profile is received (504). The client IT infrastructure profile, in some examples, may detail survey information as described in relation to the client IT infrastructure profile 110 of FIG. 1. The client IT infrastructure profile, for example, may be generated by the asset evaluation module 105 of FIG. 1.

Figure 4B:
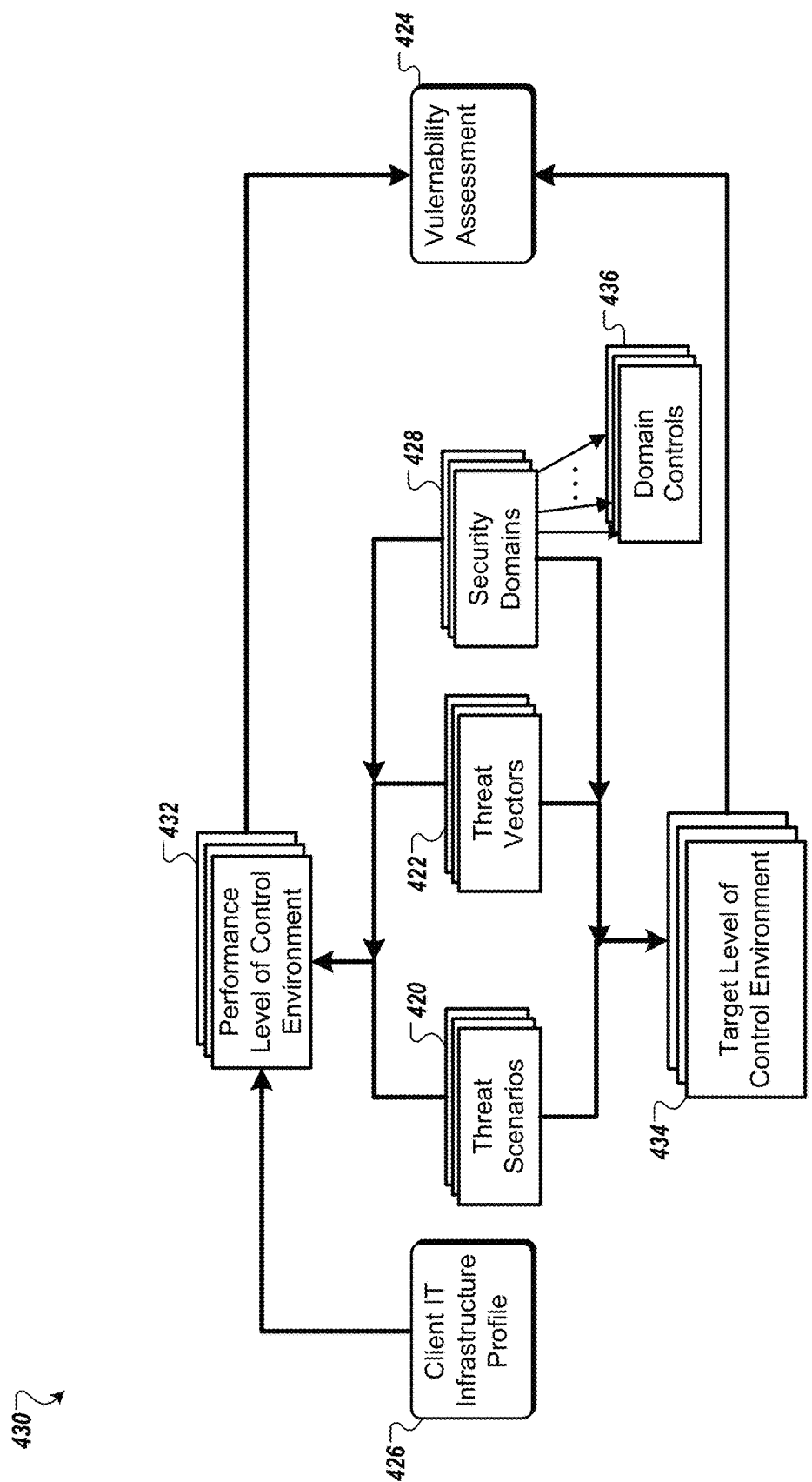
FIG. 4B depicts an exemplary overview of a cyber control evaluation module according to one or more aspects of the disclosed subject matter.

In some implementations, security domains are identified (506). The security domains may relate to domains defined by one or more cybersecurity standards. In one example, the Certified Information Systems Security Professional (CISSP) Domains (developed by (ISC) 2 of Clearwater, Fla.) include 1) security and risk management, 2) asset security, 3) security engineering, 4) communication and network security, 5) identity and access management, 6) security assessment and testing, 7) security operations, and 8) software development security. In another example, the Federal Financial Institutions Examination Council (FFIEC) Cybersecurity Assessment Tool (by the FFIEC Council of the U.S. government) includes the following domains: 1) cyber risk management and oversight, 2) threat intelligence and collaboration, 3) cybersecurity controls, 4) external dependency management, and 5) cyber incident management and resilience. In a further example, the security domains may include at least a subset of the National Institute of Standards and Technology (NIST) cybersecurity framework categories (by NIST, U.S. government agency of Gaithersburg, Md.) such as asset management, business management, governance, risk assessment, risk management strategy, access control awareness and training, data security, information protection processes and procedures, maintenance, protective technology, anomalies and events, security continuous monitoring, detection processes, response planning, communications, analysis, mitigation, and recovery planning. The security domains, in some embodiments, may be tailored to the organization's unique structure (e.g., a software development security domain only makes sense in relation to an organization involved in software development). In some embodiments, the security domains include a custom security domain definition developed to incorporate teachings of a number of existing cybersecurity standards. In further embodiments, the user may select one or more preexisting standards to mimic (e.g., a previously used or presently used assessment tool) in conforming cybersecurity recommendations with, for example, an audit assessment. The security domains, for example, may be the security domains 132 of FIG. 1. As illustrated in FIG. 4B, for example, security domains 428 are provided along with threat vectors 422 and threat scenarios 420 to conduct a vulnerability assessment 424.

Each security domain, in some implementations, includes predetermined controls that may further be evaluated to consider any vulnerability on an individual control basis. The security domain controls, for example, may follow in part the Consensus Audit Guidelines (CAG) critical cybersecurity controls (based on NIST Special Publication 800-53 for compliance with the Federal Information Security Act of 2002) including, in some examples, 1) boundary defense, 2) secure configurations for hardware and software, 3) secure configurations for network devices, 4) application software security, 5) controlled use of administrative privileges, 6) anti-malware defenses, 7) wireless device control, 8) data leakage protection, 9) secure network engineering, 10) incident response capability, 11) data back-up, and 12) security skills assessment and training. Security controls, for example, are illustrated as domain controls 436 of FIG. 4B, having a one to (potentially) many relationship with each security domain 428. A given security control, however, may be applicable for a number of security domains 428, such that security controls are not unique, necessarily, for each domain.

In some implementations, a performance level of control environment is calculated (508). The performance level of control environment may include current control performances (e.g., individual performance scores) of the organization's IT infrastructure in relation to cybersecurity vulnerability. The performance scores, in one example, may be based on the predetermined domains and, additionally, controls corresponding to each security domain. As illustrated in FIG. 4B, current control performances (e.g., performance level of the control environment 432) can be based on an evaluation of the control environment's (e.g., client IT infrastructure profile 426) estimated capability to respond to the threat scenarios 420 and threat vectors 422. The security mechanisms identified within the client IT infrastructure, for example, may be mapped to the threat scenarios and threat vectors and further mapped to security domains to categorize preparedness relative to the capability of the IT infrastructure to respond to the security scenarios and threats across security domains. Further, the breadth of the application of a particular security domain control (e.g., how wide the software solution is across potential access points within the network, how frequently software updates are applied, etc.) may be considered when determining the strength of the security mechanisms identified within the client IT infrastructure.

In a particular example, based upon a threat scenario of an internal actor and the threat vector of deployment of malware, the security domains may include preparedness (e.g., employee training to avoid clicking phishing links in emails), initial response (e.g., malware detection mechanisms), and mitigation response (e.g., how the system is configured to react and recover if malware installs and executes). The IT infrastructure may be evaluated across all of these domains. The capabilities of the IT infrastructure, for example, may be rated on an n-scale rating. In a particular example, the rating may be low, medium, or high vulnerability in light of each applicable scenario/vector/domain combination. In another example, the capabilities of the IT infrastructure may be provided with a per-domain "report card", scored on an A to F rating based upon the abilities of the IT infrastructure to deal with identified threat vectors. In some embodiments, the scores are further refined per control within each security domain. Further, the individual scores for each domain may be combined to provide an overall score per security domain.

In some implementations, a target level control environment is defined (510). The target level control environment may include target scores (e.g., levels of recommended cybersecurity preparedness) based on the threat vectors and threat scenarios for each of the security domains. For example, the target score may correspond to a minimum cybersecurity posture to minimize cybersecurity risk while intelligently allocating cybersecurity protection budget. In a particular example, the target level control environment may identify, for each security domain, an overall target score plus, for each control of each security domain, a control-level target score. The target scores, for example, may relate to the threat scores of the threat profile (e.g., a greater target response is required where a greater threat exists). As with the control environment performance analysis described in relation to step 508, the target performance levels may be provided on n-level ratings. As illustrated in FIG. 4B, the target level of the control environment 434 may be based upon the threat scenarios 420, the threat vectors 422, and the security domains 428 (and domain controls 436).

In some implementations, a vulnerability score is calculated for a given security domain (512). The vulnerability score may be calculated by determining a difference in score between the current control performance and the target score for a given security domain (and, if applicable, individual controls within the given security domain). For example, if the target score is higher than the current control performance for a given security domain, the current control performance may be vulnerable to a cyber-attack. Conversely, if the target score is lower than the current control performance for a given security domain, the current control performance may be receiving a greater allocation of cybersecurity protection budget than recommended.

Step 512 of the method 500, in some implementations, is repeated for each additional security domain (514). Upon completing this evaluation, a vulnerability assessment, in some implementations, is generated (516). The information in the vulnerability assessment represents an aggregated score across each of the security domains as each vulnerability score relates to a specific level of preparedness within a particular cybersecurity domain in view of identified likely threats to the organization's IT infrastructure. The vulnerability assessment further represents a level of preparedness relative to business objectives of the organization, as described earlier in the development of the threat profile (e.g., the business objectives 112 and threat profile 125 described in relation to FIG. 1, or the business objectives identified in step 2 of the method 200 of FIG. 2 and as used in evaluating the criticality of protecting aspects of the IT infrastructure described in the overall method 200. The vulnerability assessment, for example, may be supplied for review (e.g., by the organization) and/or as a contributor to additional analysis. In a particular example, the vulnerability assessment may be provided to the risk evaluation module 145 for use in generating the risk profile report 150, as described in relation to FIG. 1.

Figure 6:
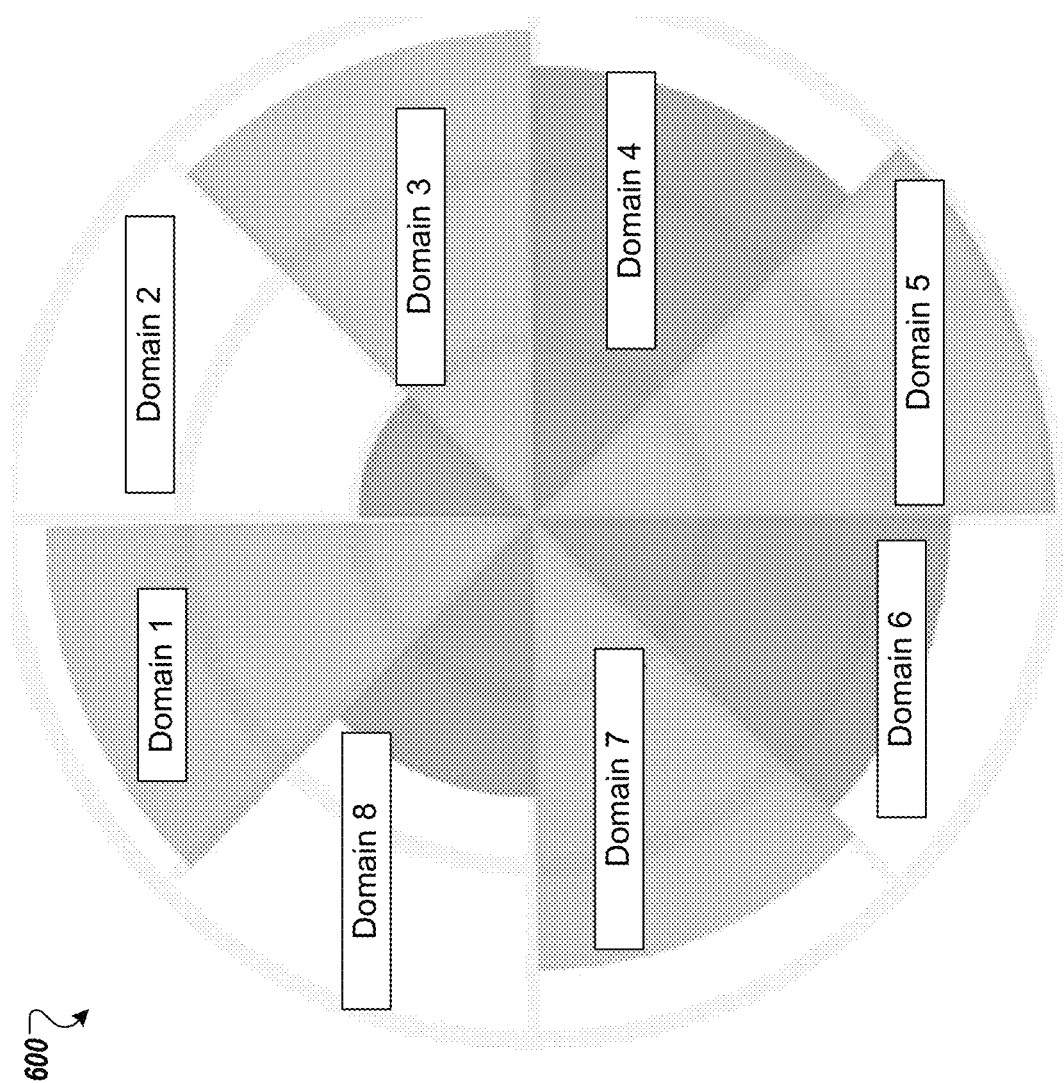
FIG. 6 depicts an exemplary target control performance visualization according to one or more aspects of the disclosed subject matter.

The generated vulnerability assessment (516) may include visualizations generated for review (e.g., by the organization). In a particular example, the visualization includes a target control performance visualization 600 of a threat profile (e.g., threat profile 125 of FIG. 1). As illustrated in FIG. 6, the visualization 600 of the threat profile can include a threat based target control performance for a specific threat scenario. The target control performance visualization 600 can include a portion for each security domain. Each portion can be filled a predetermined amount corresponding to the threat scores related to each threat identified within a threat profile (e.g., threat profile 125). For example, a low threat score can correspond to a smaller amount of the portion being filled in, while a higher score can correspond to more of the portion being filled in. The generated vulnerability assessment (516) may also include a threat-based target control performance visualization for each threat scenario in the risk assessment.

Figure 7:
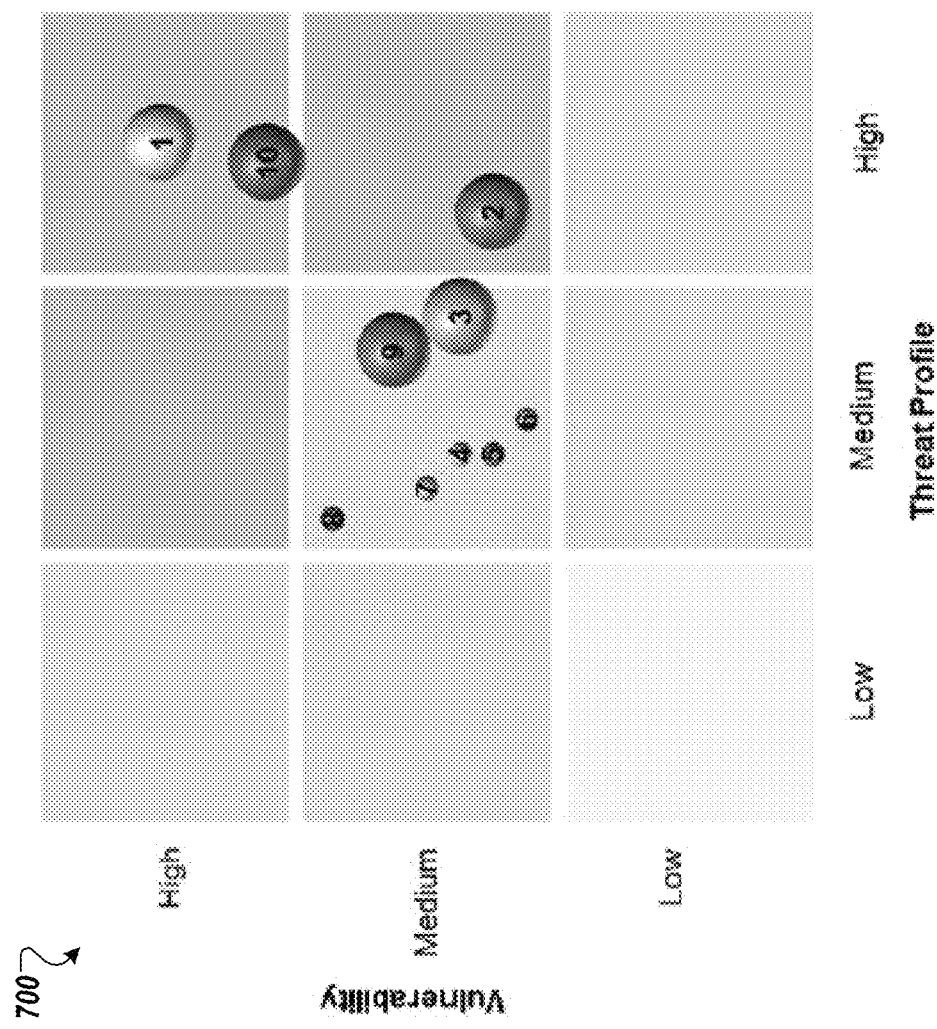
FIG. 7 depicts an exemplary risk profile heat map according to one or more aspects of the disclosed subject matter.

In a particular example, a visualization of a risk profile (e.g., risk profile 150 of FIG. 1) can be generated by a risk evaluation module (e.g., risk evaluation module 145 of FIG. 1). As illustrated in FIG. 7, the risk profile can be displayed as a heat map 700. The heat map 700 can illustrate threat profile (e.g., threat profile 125) vs. vulnerability (e.g., vulnerability assessment 140 generated from (516) of FIG. 5) including a "low", "medium", and "high" portion of each axis. The "low", "medium", and "high" may correspond to the severity of the threat or vulnerability for the threat profile axis and the vulnerability axis, respectively. The heat map 700 can highlight a priority five cyber risk scenarios as enlarged circles as identified during the risk assessment to be the most high-risk scenarios. The circles of the heat map 700, for example, may be selectable to obtain information regarding each of the cyber risk scenarios driving the scoring within the heat map 700. In another example, the visualization may include a table or map detailing the risk scenarios (1 through 10) mapped within the heat map 700.

Figure 8:
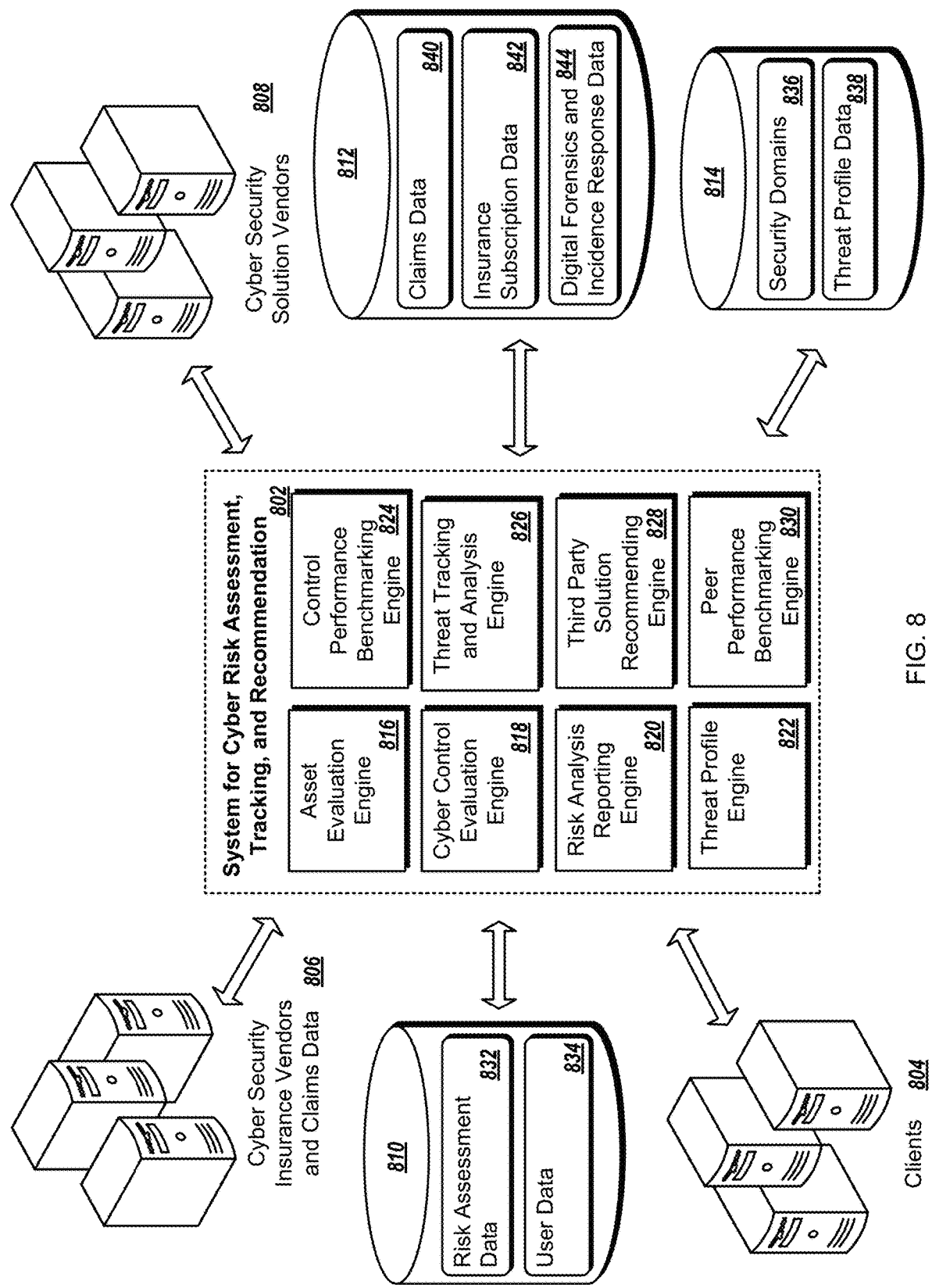
FIG. 8 illustrates a block diagram of a system and environment for cybersecurity risk assessment.

FIG. 8 illustrates various aspects of an exemplary architecture implementing a system 802 for cyber risk assessment, tracking, and recommendation. The high-level architecture includes both hardware and software applications, as well as various data communications channels for communicating data between the various hardware and software components. The architecture may be roughly divided into the system 802 for cyber risk assessment, tracking, and recommendation, client servers 804, cybersecurity insurance vendors and claims data servers 806, cybersecurity solution vendors servers 808, a pre-loss database 810, a post-loss database 812, and a cyber control evaluation database 814. Each aspect of the architecture may be located, by way of example rather than limitation, in separate geographic locations from each other, including different areas of the same city, different cities, different states, or even different countries.

Each of the client servers 804, cybersecurity insurance vendors and claims data servers 806, cybersecurity solution vendors servers 808, the pre-loss database 810, the post-loss database 812, and the cyber control evaluation database 814 can be configured to transmit data to and/or receive data from the system 802 via the various data communication channels for communicating data between the various hardware and software components. For example, the communication channels may be a proprietary network, a secure public Internet, a virtual private network or some other type of network, such as dedicated access lines, plain ordinary telephone lines, satellite links, combinations of these, etc.

The system 802 for cyber risk assessment, tracking, and recommendation may include an asset evaluation engine 816, a cyber control evaluation engine 818, a risk analysis reporting engine 820, a threat profile engine 822, a control performance benchmarking engine 824, a threat tracking analysis engine 826, a third-party solution recommending engine 828, and a peer performance benchmarking engine 830.

The asset evaluation engine 816 can receive information from the client servers 804, the information, for example, including business objectives (e.g., business objectives 112) and a client technology infrastructure profile (e.g., client technology infrastructure profile 110). The asset evaluation engine 816 may perform at least a portion of the operations of the asset evaluation module 105 described in relation to FIG. 1. For example, the asset evaluation engine 816 may be configured to execute the method 200 of FIG. 2. As illustrated in FIG. 1, the asset evaluation engine 816 may be configured to share the outcome of its evaluation, such as the criticality evaluation of the infrastructure, with the threat profile engine 822.

The threat profile engine 822 can receive information from the clients 804 including a client technology infrastructure profile (e.g., client technology infrastructure profile 110 of FIG. 1) and threat actors, threat vectors, and threat scenarios (e.g., threat actors, vectors, scenarios 122 of FIG. 1). Additionally, the threat profile engine 822 may receive the criticality evaluation of the infrastructure (e.g., criticality evaluation of infrastructure 115 of FIG. 1). The threat profile engine 822 may perform at least a portion of the operations of the asset evaluation module 105 described in relation to FIG. 1. For example, the threat profile engine 822 may be configured to execute the method 300 of FIG. 3. As illustrated in FIG. 1, the threat profile engine 822 may be configured to share the outcome of its evaluation, such as the threat profile, with the risk analysis reporting engine 820.

The cyber control evaluation engine 818 can receive information from the cyber control evaluation database 814 including security domains 836 and threat profile data 838 for cyber control evaluation. The threat profile data 838 stored in the cyber control evaluation engine 818 can be generated from the threat profile engine 822 as a result of receiving asset evaluation data from the asset evaluation engine 816. The cyber control evaluation engine 818 can determine vulnerabilities. The cyber control evaluation engine 818 may perform at least a portion of the cyber control evaluation module 130 described in relation to FIG. 1. For example, the cyber control evaluation engine 818 may be configured to execute the method 500 of FIG. 5. As illustrated in FIG. 1, the cyber control evaluation engine 818 may be configured to share the outcome of its evaluation, such as the vulnerability assessment, with the risk analysis reporting engine 820.

The risk analysis reporting engine 820 can generate a risk profile based on the vulnerabilities from the cyber control evaluation engine 818 and the threat profile engine 822. Additionally, the risk analysis reporting engine 820 can transmit information to the pre-loss database 810 including risk assessment data 832 and user data 834. The risk analysis reporting engine 822 may perform at least a portion of the risk evaluation module 145 described in relation to FIG. 1. For example, the risk analysis reporting engine 822 may be configured to generate at least a portion of the data for the risk profile report (e.g., risk profile report 150), as well as visualizations of the risk profile report as illustrated in FIG. 6 and FIG. 7.

The control performance benchmarking engine 824 can receive information from the pre-loss database 810 including risk assessment data 832 and user data 834. The control performance benchmarking engine 824 can benchmark threats and control performance against prior assessments data.

The threat tracking and analysis engine 826 can receive information from the post-loss database 812 including claims data 840, insurance subscription data 842, digital forensics and incidence response data 844. The threat tracking and analysis engine 826 can determine a correlation between threat rating, vulnerabilities, and control performance to claims experience. Further, the threat tracking and analysis engine 826 may automatically propose additional threat profile data (e.g., threat actors, threat scenarios, and/or threat vectors) presently missing from the evaluation performed by the threat profile engine 822 and cyber control evaluation engine 818. For example, the threat tracking and analysis engine 826 may alert an administrator user of the system 802 regarding previously unidentified threat actors, threat scenarios, and/or threat vectors.

The third-party solution recommending engine 828 can provide recommendations of one or more third party solutions (e.g., supplied by the cybersecurity solution vendors 808) to remedy vulnerabilities discovered by the cyber control evaluation engine 818. For example, the risk analysis reporting engine 820 may be additionally configured to report recommended solutions regarding one or more cybersecurity vulnerabilities detailed within the risk analysis report.

In some implementations, the third-party solution recommending engine 828 is configured to provide summary information regarding cybersecurity vulnerabilities on behalf of one or more clients 804 and request bids for solutions to the cybersecurity vulnerabilities.

The cybersecurity solution vendors 808, in some examples, provide hardware, software, and/or training solutions for combatting cybersecurity vulnerabilities within a system. In another example, a portion of the cybersecurity solution vendors 808 may provide testing to further refine weaknesses in a client's cybersecurity measures. For example, the third-party solution recommending engine 828 can provide output to improve vulnerabilities and output on areas which may benefit from third party testing. The cybersecurity solution vendors 808 can provide assurance and/or remediation to a client control environment. For example, the third-party solution recommendation engine 828 can recommend a third party to provide penetration testing to improve a specific vulnerability.

In some implementations, in addition to recommending cybersecurity solution vendors 808, the third-party solution recommending engine may recommend levels of insurance for insuring against losses related to cybersecurity claims. The third-party solution recommending engine 828, for example, may recommend one or more cybersecurity insurance vendors 806, or help in supporting transactions between the cybersecurity insurance vendors 806 and the clients 804. For example, the third-party solution recommending engine 828 may request, on behalf of the assessed client 804, quotes for cybersecurity insurance solutions from one or more cybersecurity insurance vendors 806. The risk assessment data 832 may be used to target particular insurance solutions and/or to negotiate improved insurance rates (e.g., due to a positive evaluation outcome from the cyber control evaluation engine 818).

The peer performance benchmarking engine 830 can compare a client's risk profile (e.g., risk profile report 150) to anonymous results of other similar clients. The anonymous results of other similar clients can be accessed via the cybersecurity insurance vendors and claims data servers 806. The similar clients can be determined to be similar based on industry, size, technology assets, identified vulnerabilities, and the like. The comparison of the currently evaluated client and similar clients can be in a combined manner (e.g., taking an average or a median of a number of similar clients) or in an individualized (but anonymous) manner (e.g., directly comparing the currently evaluated client with a number of similar clients, such as five peer clients).

Figure 9:
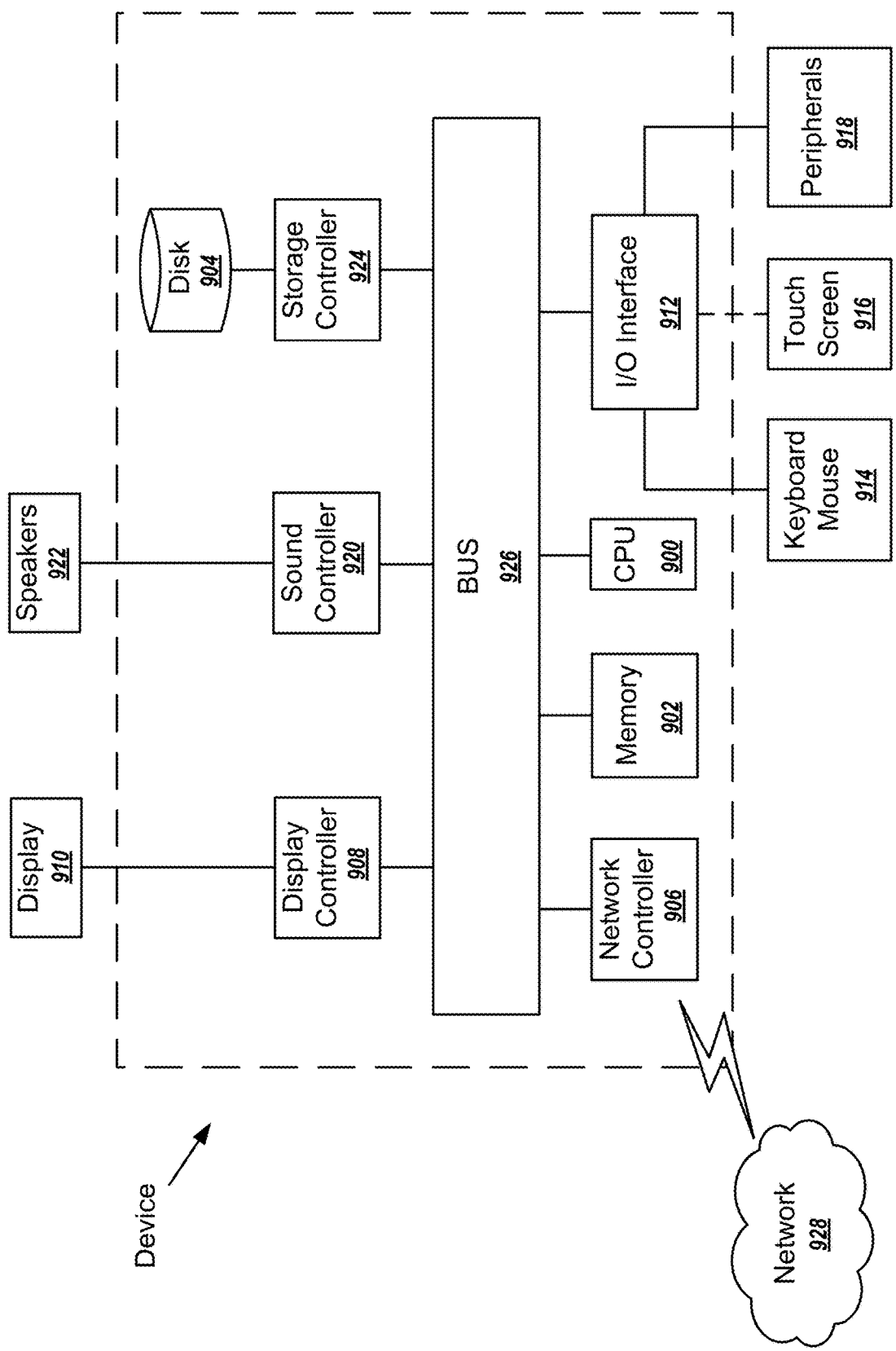
FIG. 9 is a block diagram of an example computing system.

Next, a hardware description of the computing device, mobile computing device, or server according to exemplary embodiments is described with reference to FIG. 9. In FIG. 9, the computing device, mobile computing device, or server includes a CPU 900 which performs the processes described above. The process data and instructions may be stored in memory 902. These processes and instructions may also be stored on a storage medium disk 904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer.

Further, a portion of the claimed advancements may be provided as a utility application, background daemon, or component of an operating system, or combination thereof, executing in conjunction with CPU 900 and an operating system such as Microsoft Windows 9, UNIX, Solaris, LINUX, Apple MAC-OS and other systems known to those skilled in the art.

CPU 900 may be a Xenon or Core processor from Intel of America or an Opteron processor from AMD of America, or may be other processor types that would be recognized by one of ordinary skill in the art. Alternatively, the CPU 900 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The computing device, mobile computing device, or server in FIG. 9 also includes a network controller 906, such as an Intel Ethernet PRO network interface card from Intel Corporation of America, for interfacing with network 928. As can be appreciated, the network 928 can be a public network, such as the Internet, or a private network such as an LAN or WAN network, or any combination thereof and can also include PSTN or ISDN sub-networks. The network 928 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device, mobile computing device, or server further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device, mobile computing device, or server, such as Sound Blaster X-Fi Titanium from Creative, to interface with speakers/microphone 922 thereby providing sounds and/or music.

The general-purpose storage controller 924 connects the storage medium disk 904 with communication bus 926, which may be an ISA, EISA, VESA, PCI, or similar, for interconnecting all of the components of the computing device, mobile computing device, or server. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
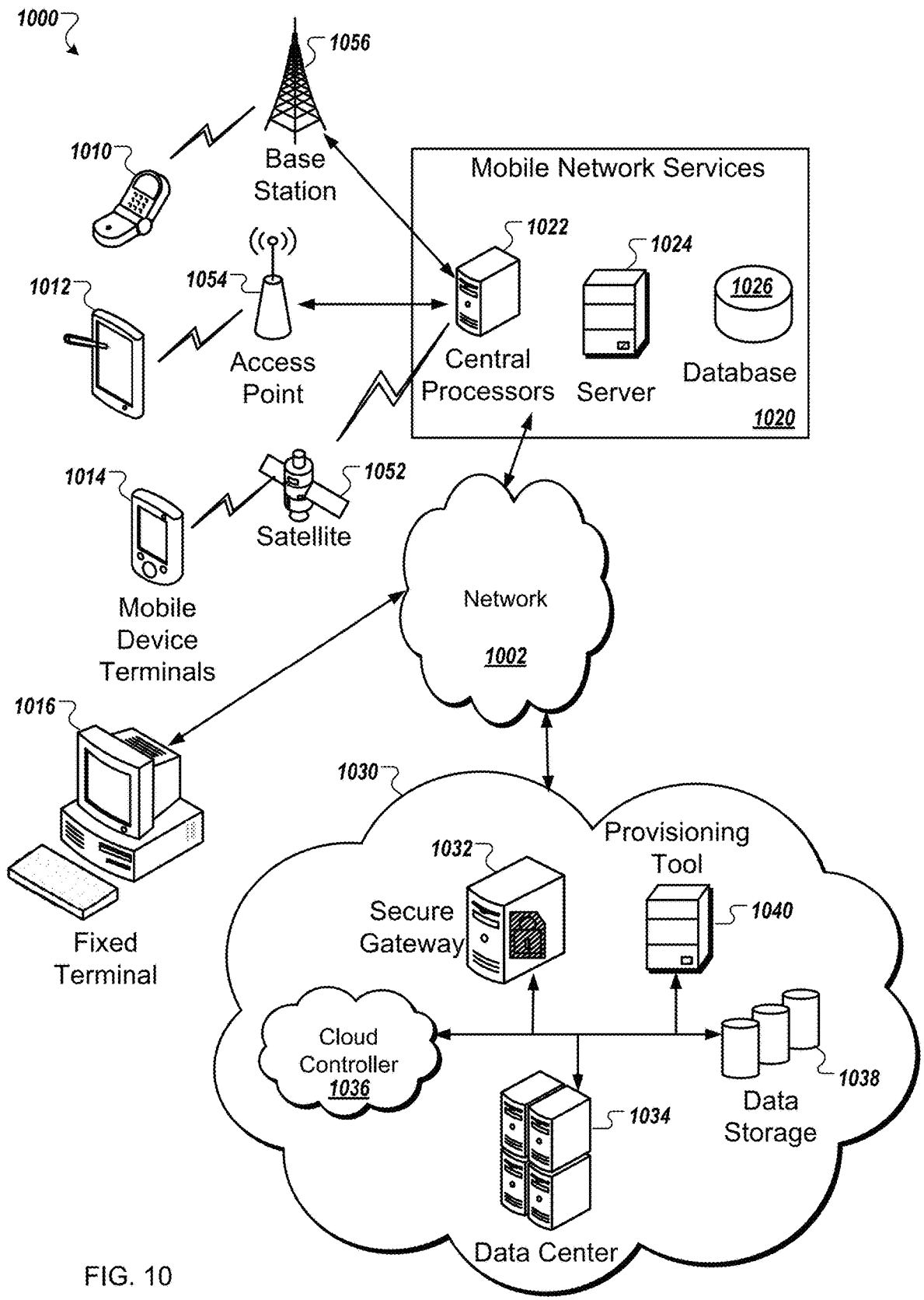
FIG. 10 is a block diagram of an example distributing computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 1030, such as Google Cloud Platform™ to perform at least portions of methods or algorithms detailed above. The processes associated with the methods described herein can be executed on a computation processor, such as the Google Compute Engine by data center 1034. The data center 1034, for example, can also include an application processor, such as the Google App Engine, that can be used as the interface with the systems described herein to receive data and output corresponding information. The cloud computing environment 1030 may also include one or more databases 1038 or other data storage, such as cloud storage and a query database. In some implementations, the cloud storage database 1038, such as the Google Cloud Storage, may store processed and unprocessed data supplied by systems described herein.

The systems described herein may communicate with the cloud computing environment 1030 through a secure gateway 1032. In some implementations, the secure gateway 1032 includes a database querying interface, such as the Google BigQuery platform.

The cloud computing environment 102 may include a provisioning tool 1040 for resource management. The provisioning tool 1040 may be connected to the computing devices of a data center 1034 to facilitate the provision of computing resources of the data center 1034. The provisioning tool 1040 may receive a request for a computing resource via the secure gateway 1032 or a cloud controller 1036. The provisioning tool 1040 may facilitate a connection to a particular computing device of the data center 1034.

A network 1002 represents one or more networks, such as the Internet, connecting the cloud environment 1030 to a number of client devices such as, in some examples, a cellular telephone 1010, a tablet computer 1012, a mobile computing device 1014, and a desktop computing device 1016. The network 1002 can also communicate via wireless networks using a variety of mobile network services 1020 such as Wi-Fi, Bluetooth, cellular networks including EDGE, 3G and 4G wireless cellular systems, or any other wireless form of communication that is known. In some embodiments, the network 1002 is agnostic to local interfaces and networks associated with the client devices to allow for integration of the local interfaces and networks configured to perform the processes described herein.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method for assessing cybersecurity risk within a technological infrastructure of an organization, the method comprising:
  receiving an infrastructure profile comprising a plurality of technological assets within the technological infrastructure;
  evaluating, by processing circuitry, the infrastructure profile to identify a portion of the plurality of technological assets as one or more critical technological assets, the one or more critical technological assets being designated important to cybersecurity based on at least one business objective, wherein the at least one business objective comprises, for each asset of the plurality of technological assets, one or more of confidentiality, integrity, availability, or financial value of data;

generating, by the processing circuitry for a first asset of the one or more critical technological assets, a threat profile comprising a plurality of potential threats to the first asset;

linking, within a non-transitory data storage region, threat data for at least one threat of the plurality of potential threats relevant to the first asset;

analyzing, by the processing circuitry, the threat data to identify, for each potential threat, a corresponding threat rating, wherein the threat rating is based on both a capability of a threat actor associated with the respective potential threat and on an asset criticality of the first asset;

analyzing, by the processing circuitry, the threat profile in view of the threat ratings to determine a target performance level of the technological infrastructure of the organization for the first asset;

evaluating, by the processing circuitry, the technological infrastructure of the organization to identify, for the first asset, a current performance level;

calculating, by the processing circuitry for the first asset, a plurality of vulnerability metrics of the organization, the vulnerability metrics comprising
 a comparison metric of the target performance level to the current performance level, and
 a preparedness metric representing a level of preparedness in view of one or more business objectives of the organization;

determining, by the processing circuitry based on at least a portion of the vulnerability metrics, at least one of i) a recommended solution targeted to a deficiency in the current performance level or ii) a recommended level of insurance for insuring against cybersecurity loss; and preparing, by the processing circuitry using the plurality of vulnerability metrics, a risk profile report for review by the organization, wherein
 the risk profile report comprises the at least one of i) the recommended solution or ii) the recommended level of insurance.

2. The method of claim 1, wherein calculating the plurality of vulnerability metrics further comprises calculating a comparison of a plurality of peer metrics to at least one asset assessment metric, wherein
the plurality of peer metrics is derived from technological infrastructures of a plurality of peer organizations to the organization, and
the at least one asset assessment metric is derived from the comparison metric.

3. The method of claim 2, wherein preparing the risk profile report comprises generating a visual representation of calculated vulnerability metrics for each of the plurality of critical technological resources, wherein
the visual representation illustrates the comparison of each of the plurality of calculated vulnerability metrics for the organization to vulnerability metrics for the plurality of peer organizations.

4. The method of claim 1, wherein the recommended solution comprises at least one product or service that, when applied to the technological infrastructure of the organization, is anticipated to improve the current performance level by mitigating or reducing at least one threat of the plurality of potential threats to the first asset.

5. The method of claim 1, further comprising, prior to evaluating the infrastructure profile:
automatically collecting, by the processing circuitry, information on one or more assets connected to a network of the organization; and
adding, by the processing circuitry, the information to the infrastructure profile.

6. The method of claim 1, wherein the infrastructure profile comprises the at least one business objective, wherein
each objective of the at least one business objective designates a relative importance of each technological resource of the portion of the critical technological assets.

7. The method of claim 1, wherein:
the infrastructure profile comprises a plurality of security mechanisms applied by the organization to the technological infrastructure; and
evaluating the technological infrastructure of the organization comprises evaluating the plurality of security mechanisms to determine, for each asset of the one or more critical technological assets, the current performance level.

8. The method of claim 1, further comprising calculating, by the processing circuitry, a plurality of risk scores as a function of the threat profile and at least a portion of the plurality of vulnerability metrics, wherein:
the plurality of risk scores comprises, for at least one of each threat of the plurality of potential threats or each domain of a plurality of security domains, a respective risk score of the plurality of risk scores, wherein
 each asset of the plurality of critical technological assets is categorized in at least one security domain of the plurality of security domains, and
 the risk profile report comprises the plurality of risk scores.

9. The method of claim 8, wherein the plurality of security domains comprise security domains defined by at least one industry or governmental cybersecurity standard.

10. The method of claim 1, wherein the comparison metric identifies an overallocation of resources based on the current performance level exceeding the target performance level.

11. The method of claim 1, further comprising:
accessing, by the processing circuitry, post loss data corresponding to at least one of claims, insurance subscriptions, digital forensics, or incidence responses associated with cyber attacks, wherein the post loss data is accessed from storage in a non-transitory computer readable medium;
correlating, by the processing circuitry, the post loss data with a portion of the plurality of technological assets; and
automatically identifying, by the processing circuitry, one or more additional threats of the plurality of potential threats based upon the correlation of the post loss data with the portion of the plurality of technological assets.

12. The method of claim 1, wherein preparing the risk profile report comprises preparing:
a first visualization of a comparison of the target performance level to the current performance level; and
a second visualization of a potential impact of the recommended solution on the target performance level.

13. The method of claim 1, wherein:
the threat data for each threat the plurality of potential threats comprises a respective threat actor and a respective threat vector; and analyzing the threat data comprises, for each threat of the plurality of potential threats, evaluating an impact of the respective threat vector on the respective asset to determine a threat scenario corresponding to the respective asset.

14. A non-transitory computer readable medium having instructions stored thereon, wherein the instructions, when executed by processing circuitry, cause the processing circuitry to:
obtain a technology infrastructure of an organization comprising a plurality of resources;
classify each resource of the plurality of resources according to a respective business unit of a plurality of business units;
identify a plurality of business objectives relevant to the technology infrastructure, wherein the plurality of business objectives each relate to at least one of confidentiality, integrity, availability, or financial value of data;
determine, for each business unit of the plurality of business units, criticality of the respective business unit in accordance with the plurality of business objectives;
determine, for each resource of the plurality of resources, a criticality of the respective resource based at least in part on the business unit of the respective resource in view of one or more business objectives relevant to the respective resource;
identify, for at least one of each resource or each business unit, threat data for one or more respective relevant threats;
generate, using the threat data, a threat profile for at least one business unit of the plurality of business units;
for a first business unit of the at least one business unit, apply the threat profile to the technology infrastructure to identify one or more relevant security domains to a set of resources of the first business unit;
calculate, for each relevant security domain of the one or more relevant security domains in light of the threat profile, a respective current performance level representing effectiveness of one or more relevant cybersecurity mechanisms of a plurality of cybersecurity mechanisms applied to the technology infrastructure in protecting at least a portion of the set of resources;
calculate, for the first business unit, a plurality of vulnerability metrics of the organization, the vulnerability metrics comprising, for each relevant security domain of the one or more relevant security domains, a comparison metric of the performance level to at least one of a target performance level or a peer performance level;
determine, for at least one of the first business unit or a first relevant security domain of the one or more relevant security domains, at least one of i) a recommended solution targeted to a deficiency in the current performance level or ii) a recommended level of insurance for insuring against cybersecurity loss; and
prepare, for presentation to a representative of the organization, a summary comprising
a comparison visualization of the respective current performance level and the at least one of the target performance level or the peer performance level, and
a recommendation visualization providing information regarding the at least one of the recommended solution or the recommended level of insurance.

15. The non-transitory computer readable medium of claim 14, wherein the instructions, when executed by the processing circuitry, further cause the processing circuitry to:
identify a plurality of peer entities sharing two or more similarities with the organization;
access one or more peer vulnerability metrics for each peer of the plurality of peer entities; and
calculate composite peer vulnerability metrics combining metrics of the plurality of peer entities;
wherein generating the comparison visualization comprises comparing, for each security domain of the one or more relevant security domains, the current performance level to a composite peer performance level.

16. The non-transitory computer readable medium of claim 14, wherein the instructions, when executed by the processing circuitry, further cause the processing circuitry to categorize each resource of the plurality of resources into a respective security domain of the plurality of security domains, wherein
the plurality of security domains comprise security domains defined by at least one industry or governmental cybersecurity standard.

17. The non-transitory computer readable medium of claim 14, wherein calculating the respective current performance level comprises calculating, for each relevant security domain of at least a portion of the one or more relevant security domains, the respective performance level based at least in part on a cybersecurity budget allocation relevant to the respective security domain.

18. The non-transitory computer readable medium of claim 14, wherein the threat data identifies two or more of an intent, an objective, or a capability of a threat actor corresponding to each threat of the one or more respective relevant threats.

19. The non-transitory computer readable medium of claim 14, wherein obtaining the technology infrastructure comprises presenting an online survey to one or more personnel of the organization.

20. The non-transitory computer readable medium of claim 14, wherein the summary comprises a respective quote for obtaining the at least one of the recommended solution or the recommended level of insurance.

* * * * *